(12) United States Patent
Wang

(10) Patent No.: US 6,519,043 B1
(45) Date of Patent: Feb. 11, 2003

(54) VECTOR MEASUREMENT FOR COORDINATE MEASURING MACHINE

(75) Inventor: Charles Wang, Palos Verdes, CA (US)

(73) Assignee: Optodyne, Inc.

( * ) Notice: Subject to any disclaimer, the term of this patent is extended or adjusted under 35 U.S.C. 154(b) by 0 days.

(21) Appl. No.: 09/623,437

(22) PCT Filed: Jun. 29, 1999

(86) PCT No.: PCT/US99/14815

§ 371 (c)(1),
(2), (4) Date: Sep. 5, 2000

(87) PCT Pub. No.: WO00/00784

PCT Pub. Date: Jan. 6, 2000

Related U.S. Application Data

(60) Provisional application No. 60/122,695, filed on Mar. 3, 1999, and provisional application No. 60/691,237, filed on Jun. 30, 1998.

(51) Int. Cl.$^7$ .............................................. G01B 11/14

(52) U.S. Cl. ..................................................... 356/614

(58) Field of Search ........................... 356/614, 3, 3.01, 356/623

(56) References Cited

FOREIGN PATENT DOCUMENTS

WO    WO 93/08449    *    4/1993

* cited by examiner

*Primary Examiner*—Michael P. Stafira
(74) *Attorney, Agent, or Firm*—Russell E. Hattis

(57) ABSTRACT

A method of obtaining by use of a laser measuring apparatus position measurement error information of a body to be moved under computer control in a volumetric space along paths having designated measuring points for position error evaluation or correction. The method in a preferred form includes the steps of directing a laser beam in a given direction in said space and placing a laser beam reflector on the body to be moved in directions non-parallel to said direction, the reflector being sufficiently large that it will receive and reflect said directed laser beam back to said apparatus for actual reflector distance measurement along the beam path as said body is so moved. Then, with the computer of said system moving said body along said non-parallel paths measuring and recording with said apparatus the actual positions of said reflector along said beam path as the body reaches said various measuring points. The actual reflector position measurements are compared with the ideal reflector measurements and from the reflector position error so determined the body position error components at said measuring points are computed.

34 Claims, 8 Drawing Sheets

VECTOR MEASUREMENT FOR COORDINATE MEASURING MACHINE

RELATED APPLICATION

This application is based upon U.S. Provisional Application No. 60/691,237, filed Jun. 30, 1998 and U.S. Provisional Application No. 60/122,695, filed Mar. 3, 1999.

BACKGROUND OF THE INVENTION

The performance or accuracy of a CNC (computer numerical control) machine tool or a coordinate measuring machine (CMM) is determined by the linear displacement errors, straightness errors, squareness errors, angular errors and non-rigid body errors of the machine tool spindle movement (to generalize the moving body which could be something other than a machine tool spindle the term "body" will be often used instead of spindle). A complete measurement of these errors is very complex and time consuming. Diagonal measurements of the body movement taken continuously along the diagonals of a volumetric space have been recommended for a quick check on the volumetric performance of the machine. However, with this measurement system there is not enough information to identify the error sources for accurate machine quality assessment and error correction.

The characterization of a machine tool body movement is very complex. The machine tool body movement errors are referred to broadly as linear error, angular errors, and squareness errors. The linear errors break down into what are referred to as linear displacement errors and vertical straightness and horizontal straightness errors. Angular errors include pitch, yaw and roll errors. Thus for each of the X, Y and Z axis of motion, there are 6 recognized errors, 3 linear, and 3 angular errors plus 1 squareness error. Thus, for a 3 axis machine, there are a total of 21 of these error.

For a non-rigid body there are many more errors. Existing methods of measuring these errors for calibration and accuracy evaluation using laser interferometer and other means has been very difficult and time consuming until the present invention was developed.

The machine accuracy can be improved by measuring all the above referred to errors and then compensating these errors, providing that the machine tool body movement is repeatable. The key is how to measure these errors accurately and quickly. The inferior previous methods for measuring these errors include the methods disclosed by G. Zhang, R. Ouyang, B. Lu, R. Hocken, R. Veale, and A. Donmes, in an article entitled "A displacement method for machine geometry calibration", Annals of the CIRP Vol. 37, No. 1. 1988, pp 515–518, and W. L. Beckwith, Jr. in U.S. Pat. No. 4,939,678, grated Jul. 3, 1990 entitled "Method for calibration of coordinate measuring Machine". These errors for calibration and accuracy evaluation using laser interferometer and other means has been very difficult and time consuming until the present invention was developed.

One example of a laser interferometers which have been used for measuring linear displacement is for example, model HP 5529, manufactured by Hewlett-Packard, Palo Alto, Calif. The straightness accuracy of the body movement using these prior measurement techniques can be measured, for example, by a laser interferometer using angular optics or a quad-detector as, for example, model MCV-3000, manufactured by Optodyne, Inc., of Compton, Calif. The prior art squareness measurements and these other measurements are carried out by directing a laser beam parallel to a selected diagonal of the space in which the body involved can be moved (referred to hereafter as the volumetric space) and the body is moved intermittently along the diagonal as measurements are taken. This process is duplicated for at least one other diagonal and preferably all four diagonals of this space. These laser interferometer diagonal measurements are recommended in the ASME B5.54 standard (section 5.9.2 in Methods for Performance Evaluation of Computer Numerically Controlled Machining Centers, ASME B5.54-1992, American Society of Mechanical Engineers, New York, N.Y.) for the check of volumetric performance.

These intermittent diagonal measurement techniques have heretofore been assumed to be a quick check of the machine accuracy. This was because the diagonal measurement is sensitive to all the errors. Hence, if the diagonal measurement shows the error is small, good machine accuracy has been assured. On the other hand, if the intermittent diagonal measurement shows the error is large, it has been rather difficult to determine the cause of this large error. As above indicated, these prior art techniques are time consuming, particularly if all of the errors are measured. Thus, they need as many as 18 separate setups and measurements respectively for the displacement, straightness, angular and squareness measurements. This can take two of three days to complete which can result in substantial undesired downtime of the machine involved.

Disclosed here is a new measurement method, referred to herein as a vector measurement method. It can measure all these errors, using a simple and portable laser interferometer or a laser Doppler displacement meter (LDDM), in 4 settings and within a few hours. Also, this method is so simple and easy to carry out that in-house personnel of a typical machine tool shop can readily take the measurements and then compensate for the errors involved.

SUMMARY OF THE INVENTION

The present invention involves apparatus and a method of using such apparatus which provides a vector measurement technique which enables the movement error components above described to be determined more accurately and efficiently than the prior art. It does so by directing a beam of reflectable energy in a direction non-parallel to the direction of movement of the body along paths having measuring points. (In contrast, the prior art error measurement techniques moved the body in the same direction, that is, along the beam path.) A reflector reflects the energy back to a measuring apparatus which measures the distance between the apparatus and the reflector at these different measuring points. These reflector distance measurements vary with the body position and they are then compared with predetermined ideal reflector distances measurements for these points on the assumption that the body is moved without error to these points by the computer control system involved. This comparison produces reflector distance error values from which the actual body position error components described above can be computed.

Because the prior art error measurement technique moved the body along the beam path and took its measurements at only points along the path, it cannot directly measure the straightness and other error components in directions perpendicular to the direction of body movement.

As in the prior art, the vector measurement technique of the present invention preferably uses a laser beam reflector and a measuring apparatus which measures the distance between the measuring apparatus and the point on the reflector where the laser beam is reflected. However, the broad aspects of the invention encompass the use of reflectable energy other than laser beam energy. Thus it includes the use of such energy sources as radar frequency or other electromagnetic energy sources or an acoustic energy source with measuring apparatus which measures the distance between the source of such energy and the point where a beam of such energy is reflected by a reflector back to the measuring apparatus.

Also, while it is highly preferred that the body to be moved carries the reflector and the measuring apparatus is stationary and directs a beam of the energy involved along a diagonal (or other less preferred direction) in the two or three dimensional space in which the body is moved, the positions of the apparatus and the reflector could be reversed without deviating from the broader aspects of the invention.

In the preferred invention summary now to be made and in the drawings and the description thereof to follow, a much larger than normal laser beam reflector is carried by the body being moved and a stationary laser measuring apparatus directs the laser beam along a diagonal of a three dimensional space. The reflector is sufficiently large that it will intercept the laser beam even when the body is spaced from and is moved along paths which extend a substantial distance from the diagonal. The body is preferably moved sequentially in groups of three repeated incremental steps along the X, Y and Z axes. The first step in each group begins on a segment of the diagonal involved and the body is directed to move a given distance parallel to the first of the axes involved. The laser measuring apparatus then measures and records the actual distance between the apparatus and the point on the laser beam reflector which reflects the laser beam on the selected diagonal. The next step in each group is to direct the body to move a given distance parallel to one of the other two axes a distance where the body can be returned to the end of the segment involved when the body is moved parallel to the third axis involved if the body is ideally moved without any error components. A similar distance measurement is taken and recorded. The last step in each group is to move the body parallel to the third axis to return it to or near the end of the segment involved. This same xyz axes sequence of movement is then repeated until all of the diagonal segments are traversed.

If the body was moved exactly the desired distance each step of the process as directed by the computer program involved then there is no error in the body movement and the distance measurements along the diagonal will confirm this. However, there is almost always some error in the movement distances which will be reflected in the laser beam reflection point distances. Each error type will have an effect in these laser apparatus measured distances. The present invention then desirably calculates the various error components from these laser apparatus measurements and error compensation tables can then be produced which are used to generate control signals which will cause the X, Y and Z axis motor controllers to move the body more accurately as it performs its assigned function.

As compared to the prior art laser measurement technique which moves the body along the same diagonal along which the laser beam is directed, the present invention collects 3 times more data. Furthermore, the data collected after each incremental movement along a given axis is due only to that movement and so that the error sources involved in each of these movements can be separated.

If backlash errors are to be considered, then after all of the measurements are taken as the body involved is moved in the selected sequence from one end of a selected diagonal to the other, the body is then moved with respect to this diagonal and the above mentioned measurements and computations taken as the body is moved in the reverse direction following the similar paths the body was just moved to each point. This requires, of course, the movement of the body along the X, Y and Z axes in the reverse order.

The steps just described carried out along a first selected diagonal then should be carried out along at least another diagonal using the same axis movement sequence as before when the volumetric space is a greatly elongated one (that when a large aspect ratio is involved). The process described is preferably repeated again for at least one more and preferably for all of the diagonals. Since each set of body diagonal measurements for a given sequence produces 3 sets of data, there are 12 sets of data which are collected when all four diagonals are involved in the measurements made. This produces enough data to determine the 3 displacement errors, 6 straightness errors, and 3 squareness errors. If only two diagonals are involved, there is enough data to determine 3 linear displacement and 3 straightness errors.

Part of this improved sequential diagonal measurement technique based on a single sequential three axis movement and data collection method is disclosed in an article of G. Liotto and C. P. Wang, entitled Laser Doppler Displacement Meter (LDDM) Allows new Diagonal Measurement for Large Aspect Ratio Machine Tool easily and accurately in the Proceedings of LAMDAMAP '97, University of Huddersfield, Queensgate, Huddersfield, England, Jul. 15–17, 1997. The present application adds a further improvement in that the measurements and calculations above described are made with more than 2 diagonals and more than one axis movement sequence. Thus, if one of the sequences was XYZ, the process described above is repeated for at least one more or two added sequences and preferably for all six sequences. Carrying out the process described for three different sequences (e.g. XYZ, YZX and ZXY) over three diagonals will generate 27 sets of data which is enough to determine the rigid body errors (both linear, angular and squareness errors, a total of 21 errors). If the above method is carried out for all six of the possible sequences (i.e. YZY, YYZ and ZYX in addition to the above) for all four diagonals, there will be generated 48 sets of data is enough to solve all the linear errors, angular errors and some non-rigid body errors, which could be used to determine both rigid and non-rigid body errors. The same vector measurement method can also be applied to non-conventional machines such as 4 or more axes machines, non-orthogonal motion machines, hexapod machines and parallel linkage machines.

As above indicated, the present invention uses laser measurement equipment which uses unusually large laser beam reflectors which will intercept the laser beam directed along a diagonal of the volumetric space involved, despite the fact that the body carrying the reflector moves substantial distances laterally of the diagonal involved. If a corner cube or retroreflector is used, conventionally sized reflectors are too small for this purpose. For large lateral deviations, a flat reflector is preferably used as the laser beam reflector. Another aspect of the present invention involves the manner in which the errors determined by the above described aspects of the invention are used to compensate for the errors computed thereby so that the machine tool involved will operate more accurately. These computed errors are used to form compensation tables which can be incorporated into the X, Y and Z axis motor controllers which have to be specially programmed to use these tables. One aspect of the present invention is to use an interpolator software with all the measured errors to provide error compensation signals for the controller which can therefore be a conventional controller.

BASIC THEORY TO DETERMINE LINEAR, ANGULAR AND SQUARENESS ERRORS

1) Motion of a Rigid Body

The general motion of a rigid body along one axis can be described by 6 degrees of freedom. These are one linear, 2 straightness, pitch, yaw and roll. For a 3-axis machine, there are 18 degrees of freedom plus 3 squareness, a total of 21 degrees of freedom.

2) Assumptions

To simplify the analysis, the following assumptions are made:

The motion is repeatable to within certain uncertainty.

The motion and position errors can be superpositioned, i.e. the position error is much smaller than the travel distance.

For most machine tools or CMMS, the above assumptions are a good approximation.

3) Body Diagonal Motion

Figure 1:
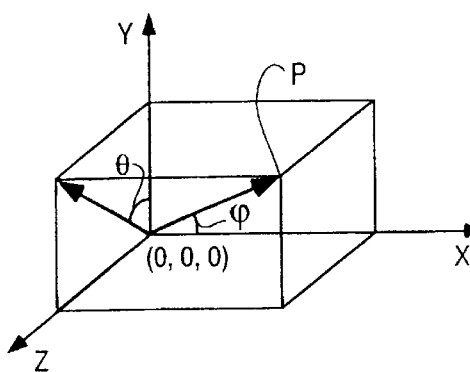
FIG. 1 shows a volumetric space in which a body is to be moved and the polar and Cartesian coordinates of a body in a given position P in that space.

A body diagonal motion can be expressed as from the origin (0,0,0) to a diagonal point P (X, Y. Z) as shown in FIG. 1.

The distance between 0 to P is $$R=\sqrt{x^2+y^2+z^2}$$

Also, in polar coordinates,

X=R cos φ

Y=R sin φsin θ

Z=R sin φcos θ

4) Measurement Along Body Diagonal

Assume the measurement is along the R-direction, which is a function of X, Y, and Z, then the deviation in R can be expressed as the sum of deviation in R due to X-axis motion, due to Y-axis motion and due to Z-axis motion. Hence.

$$\frac{\Delta R}{R} = \left(\frac{\Delta R}{R}\right)_x + \left(\frac{\Delta R}{R}\right)_y + \left(\frac{\Delta R}{R}\right)_z \quad (1)$$

5) Volumetric Error Analysis

For each axis of motion, there are linear position errors in X, Y, and Z-direction, pitch, yaw and roll angles. Hence, for X-axis movement, Linear position error $\delta_x(x)$ Straightness errors $\delta_y(x)$, $\delta_z(x)$ Pitch, Yaw and Roll $\alpha_y(x)$, $\alpha_z(x)$, $\alpha_x(x)$ Similarly for Y-axis and Z-axis movement, Linear position errors $\delta_y(y)$, $\delta_z(z)$ Straightness errors $\delta_x(y)$, $\delta_z(y)$, $\delta_y(z)$, $\delta_x(z)$ Pitch, Yaw and Roll angles $\alpha_x(y)$, $\alpha_z(y)$, $\alpha_y(y)$, $\alpha_x(z)$, $\alpha_y(z)$, $\alpha_z(z)$ The squareness between axes is $\theta_{xy}$, $\theta_{yz}$, $\theta_{zx}$ As shown by Schaltshik (R. Schaltschik, "The components of the volumetric accuracy", Annals of tl-ie CIRP Vol. 25, No. 1, 1977, pp223–228) and Zhang (G. Zhang, R. Ouyang, B. Lu, R. Hocken, R. Veale, and A. Donmez, "A displacement method for machine geometry calibration", Annals of the CIRP Vol. 37, No. 1, 1988, pp515–518), the volumetric error is the difference between the actual spindle position and the true spindle position. The true spindle position can be calculated by the coordinate $P_x = \delta_x(x) + z \cdot \alpha_y(x) - y \cdot [\alpha_z(x) + \theta_{xy}] + \delta_x(y) + z \cdot [\alpha_y(y) - \theta_z] + \delta_x(z)$ $P_y = \delta_y(x) - z \cdot [\alpha_x(x) + \theta_{yz}] + \delta_y(y) - z \cdot \alpha_x(y) + \delta_y(z)$ $P_z = \delta_z(x) - y \cdot \alpha_x(x) + \delta_z(y) + \delta_z(z) \quad (2)$ transformations of each axis movement. For a machine type FXYZ, the position errors can be expressed as Where $P_x$, $P_y$, and $P_z$ are position errors in the x, y and z direction respectively.

Hence Equation (1) becomes $$\left(\frac{\Delta R}{R}\right)_x = \frac{x^2}{R^2} \cdot \left[\frac{\delta_x(x) - y \cdot [\alpha_z(x) + \theta_{xy}] + z \cdot \alpha_y(x)}{x}\right] + \quad (3)$$
$$\frac{x \cdot y}{R^2} \cdot \left[\frac{\delta_y(x) - z \cdot [\alpha_x(x) + \theta_{yz}]}{x}\right] + \frac{x \cdot z}{R^2} \cdot \left[\frac{\delta_z(x) - y \cdot \alpha_x(x)}{x}\right]$$

$$\left(\frac{\Delta R}{R}\right)_y = \frac{x \cdot y}{R^2} \cdot \left[\frac{\delta_x(y) + z \cdot [\alpha_y(y) + \theta_{xy}]}{y}\right] +$$
$$\frac{y^2}{R^2} \cdot \left[\frac{\delta_y(y) - z \cdot \alpha_x(y)}{y}\right] + \frac{y \cdot z}{R^2} \cdot \left[\frac{\delta_z(y)}{y}\right]$$

$$\left(\frac{\Delta R}{R}\right)_z = \frac{x \cdot z}{R^2} \cdot \left[\frac{\delta_x(z)}{z}\right] + \frac{y \cdot z}{R^2} \cdot \left[\frac{\delta_y(z)}{z}\right] + \frac{z^2}{R^2} \cdot \left[\frac{\delta_z(z)}{z}\right]$$

Let $\tilde{\delta}_z(x) = \delta_z(x) - y \cdot \alpha_x(x)$ $\tilde{\delta}_x(x) = \delta_x(x) - y \cdot [\alpha_z(x) + \theta_{xy}] + z \cdot \alpha_y(x)$ $\tilde{\delta}_x(y) = \delta_x(y) + z \cdot [\alpha_y(y) + \theta_{xy}]$ $\tilde{\delta}_y(x) = \delta_y(x) - z \cdot [\alpha_x(x) + \theta_{yz}]$ $\tilde{\delta}_y(y) = \delta_y(y) - z \cdot \alpha_x(y)$ $\tilde{\delta}_y(y) = \delta_z(y)$ $\tilde{\delta}_x(z) = \delta_x(z)$ $\tilde{\delta}_y(z) = \delta_y(z)$ $\tilde{\delta} z_z(z) = \delta_z(z) \quad (4)$ Then Eq. (3) can be expressed as $$\left(\frac{\Delta R}{R}\right)_x = \frac{x^2}{R^2} \cdot \frac{\tilde{\delta}_x(x)}{x} + \frac{y \cdot x}{R^2} \cdot \frac{\tilde{\delta}_y(x)}{x} + \frac{z \cdot x}{R^2} \cdot \frac{\tilde{\delta}_z(x)}{x} \quad (5)$$

$$\left(\frac{\Delta R}{R}\right)_y = \frac{y^2}{R^2} \cdot \frac{\tilde{\delta}_y(y)}{y} + \frac{x \cdot y}{R^2} \cdot \frac{\tilde{\delta}_x(y)}{y} + \frac{z \cdot y}{R^2} \cdot \frac{\tilde{\delta}_z(y)}{y}$$

$$\left(\frac{\Delta R}{R}\right)_z = \frac{z^2}{R^2} \cdot \frac{\tilde{\delta}_z(z)}{z} + \frac{x \cdot z}{R^2} \cdot \frac{\tilde{\delta}_x(z)}{z} + \frac{y \cdot z}{R^2} \cdot \frac{\tilde{\delta}_y(z)}{z}$$

6) Squareness Error

When the angle between X and Y is not exactly 90 degrees, then the diagonal distance R is equal to $$\sqrt{x^2 + y^2 + 2xy \cos \phi}$$

where $\phi = 90° + \theta_{xy}$

For small $\theta_{xy}$, $\cos \phi$ can be approximated to $\theta_{xy}$. Hence, $R^2 = x^2 + y^2 + 2xy \, \theta_{xy}$ Therefore the change in diagonal distance due to non-squareness can be expressed as $$\left(\frac{\Delta R}{R}\right)_s = \frac{y \cdot z}{R^2} \cdot \vartheta_{yz} \cdot \frac{y \cdot x}{R^2} \cdot \vartheta_{yz} + \frac{z \cdot x}{R^2} \cdot \vartheta_{zx} \quad (6)$$

where $\theta_{yz}$ is non-squareness in the YZ-plane, $\theta_{yx}$ is non-squareness in the YX-plane, and $\theta_{zx}$ is the non-squareness in the ZX-plane.

$\theta_{zx}$ is the non-squareness in the ZX-plane.

7) Four diagonal measurements

There are 4 diagonals, namely from (0, 0, 0) to (X, Y, Z): diagonal #1

(XY 0, 0) to (0, Y, Z): diagonal #2

(0, Y, 0) to (X, 0, Z): diagonal #3

(0. 0, Z) to (X, Y, 0): diagonal #4 and the reverses. Please note that,

Diagonal #1 all increments in X, Y, Z are positive

Diagonal #2 all increments in Y and Z are positive and increment in X is negative Diagonal #3 all increments in X and Z are positive and increment Y is negative Diagonal #4 all increments in X and Y are positive and increment in Z is negative.

Substitute these into Eq (8), we have $$\left(\frac{\Delta R}{R}\right)_x (+, +, +) = \frac{x^2}{R^2} \cdot \frac{\tilde{\delta}_x(x)}{x} + \frac{y \cdot x}{R^2} \cdot \frac{\tilde{\delta}_y(x)}{x} + \frac{z \cdot x}{R^2} \cdot \frac{\tilde{\delta}_z(x)}{x}$$

$$\left(\frac{\Delta R}{R}\right)_x (-, +, +) = \frac{x^2}{R^2} \cdot \frac{\tilde{\delta}_x(x)}{x} - \frac{y \cdot x}{R^2} \cdot \frac{\tilde{\delta}_y(x)}{x} - \frac{z \cdot x}{R^2} \cdot \frac{\tilde{\delta}_z(x)}{x}$$

$$\frac{R}{R_x}(\;) \frac{x}{R} \frac{\tilde{}_x(x)}{x} \frac{y \, x}{R} \frac{\tilde{}_y(x)}{x} \frac{z \, x}{R} \frac{\tilde{}_z(x)}{x}$$

$$\left(\frac{\Delta R}{R}\right)_x (+, +, -) = \frac{x^2}{R^2} \cdot \frac{\tilde{\delta}_x(x)}{x} + \frac{y \cdot x}{R^2} \cdot \frac{\tilde{\delta}_y(x)}{x} - \frac{z \cdot x}{R^2} \cdot \frac{\tilde{\delta}_z(x)}{x}$$

Similarly for $$\left(\frac{\Delta R}{R}\right)_y \text{ and } \left(\frac{\Delta R}{R}\right)_z.$$

$$\frac{\tilde{\delta}_z(x)}{z} = \frac{1}{2} \cdot \frac{R^2}{|x \cdot z|} \cdot \left[\left(\frac{\Delta R}{R}\right)_x(+,+,+) - \left(\frac{\Delta R}{R}\right)_x(+,+,-)\right]$$

$$\frac{\tilde{\delta}_y(x)}{y} = \frac{1}{2} \cdot \frac{R^2}{|x \cdot y|} \cdot \left[\left(\frac{\Delta R}{R}\right)_x(+,+,+) - \left(\frac{\Delta R}{R}\right)_x(+,-,+)\right]$$

Solve these Equations for a $\tilde{\delta}_x(x)$ $\tilde{\delta}_y$ and $\tilde{\delta}_z(x)$ we have $$\frac{\tilde{\delta}_x(x)}{x} = \frac{1}{2} \cdot \frac{R^2}{x^2} \cdot \left[\left(\frac{\Delta R}{R}\right)_x(+,+,+,) + \left(\frac{\Delta R}{R}\right)_x(-,+,+)\right] \quad (8)$$

Similarly is the y-direction and z-direction $$\frac{\tilde{\delta}_z(z)}{z} = \frac{1}{2} \cdot \frac{R^2}{z^2} \cdot \left[\left(\frac{\Delta R}{R}\right)_z(+,+,+) + \left(\frac{\Delta R}{R}\right)_z(+,+,-)\right] \quad (9)$$

$$\frac{\tilde{\delta}_y(z)}{y} = \frac{1}{2} \cdot \frac{R^2}{|y \cdot z|} \cdot \left[\left(\frac{\Delta R}{R}\right)_z(+,+,+) - \left(\frac{\Delta R}{R}\right)_z(+,-,+)\right]$$

$$\frac{\tilde{\delta}_x(z)}{x} = \frac{1}{2} \cdot \frac{R^2}{|x \cdot z|} \cdot \left[\left(\frac{\Delta R}{R}\right)_z(+,+,+) - \left(\frac{\Delta R}{R}\right)_z(-,+,+)\right]$$

$$\frac{\tilde{\delta}_z(y)}{z} = \frac{1}{2} \cdot \frac{R^2}{|y \cdot z|} \cdot \left[\left(\frac{\Delta R}{R}\right)_y(+,+,+) - \left(\frac{\Delta R}{R}\right)_y(+,+,-)\right]$$

$$\frac{\tilde{\delta}_y(y)}{y} = \frac{1}{2} \cdot \frac{R^2}{y^2} \cdot \left[\left(\frac{\Delta R}{R}\right)_y(+,+,+) + \left(\frac{\Delta R}{R}\right)_y(+,-,+)\right]$$

$$\frac{\tilde{\delta}_x(y)}{x} = \frac{1}{2} \cdot \frac{R^2}{|x \cdot y|} \cdot \left[\left(\frac{\Delta R}{R}\right)_y(+,+,+) - \left(\frac{\Delta R}{R}\right)_y(-,+,+)\right]$$

8) Squareness Errors

The squareness errors can be determined by the displacement error at the end point of the 4 diagonal measurements.
Solve Eq (6), we have $$\vartheta_{yz} = \frac{1}{2} \cdot \frac{R^2}{|yz|} \cdot [\text{Diagonal \#1} + \text{Diagnal \#2}] \quad (10)$$

$$\vartheta_{zx} = \frac{1}{2} \cdot \frac{R^2}{|zx|} \cdot [\text{Diagonal \#1} + \text{Diagnal \#3}]$$

$$\vartheta_{yx} = \frac{1}{2} \cdot \frac{R^2}{|yx|} \cdot [\text{Diagonal \#1} + \text{Diagnal \#4}]$$

(9) Sort Data and Order

The sequential diagonal measurement collects data after each axis movement. Hence, three times more data are collected. Sort out all position errors due to X-axis movement, Y-axis movement and z-axis movement. These measured position errors are $\Delta R_x$, $\Delta R_y$, and $\Delta R_z$. For machines with small angular errors and small non-rigid body errors, is very close to $\delta$. To determine the angular errors and non-rigid body errors, data collected by different sequences, such as YZX, ZXY, etc. are needed. The angular errors and non-rigid body errors can be calculated by the measured data.

Detailed Description of the Exemplary Embodiment in FIGS. 2–12

Figure 2:
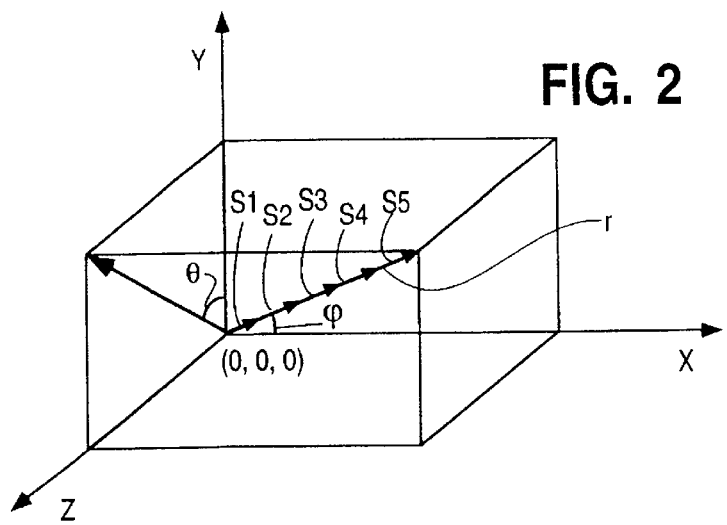
FIG. 2 shows the volumetric space in which a body is to be moved in accordance with the invention in incremental X, Y and Z axis movements along various segments of a diagonal r of that space.

Refer now to FIG. 2 which shows the volumetric space in which the body to be moved by the present invention can be moved by the machine involved. The Figure shows five diagonal segments S1, S2, S3, S4 and S5 of a diagonal r of that space and alone, which diagonal the laser beam of a laser interferometer position measuring system is directed. The diagonal r is shown as extending between points (0,0,0) and (X,Y,Z). The opposite diagonal to that diagonal not shown in FIG. 2 would extend between points (O,O,Y) and (X,Y,O). The body carries a retroreflector, which can be a retroreflector like RF2 shown in FIG. 10a or a flat reflector RF3 like that shown in FIGS. 10b and 10c.

In accordance with the present invention, the body is moved sequentially in incremental movement groups in directions parallel to or along the X, Y and Z axes of this space. Each movement group starts at the beginning of a diagonal segment and ends at the incremental of the next segment of the diagonal. At the end of each incremental X, Y or Z axis increment of movement the laser interferometer position measuring system makes a measurement of the distance between the laser beam source and the point along the diagonal involved where the reflector intercepts the laser beam and stores the measurement in a computer memory where the various error variables are computed after position measurements are completed. It is preferred that the body movement is halted during each position measurement. Position measurements as just described are taken for body movement along a pair of opposite diagonals of the volumetric space for machines with a large aspect ratio and for body movements along all four diagonals of this space for machines which do not have a large aspect ratio.

The position of the end of the first diagonal segment S I can be represented by X, Y and Z coordinates or in polar coordinates as a vector having a length r and making angles Theta and Phi shown in FIG. 1 with respect to the X and Z axis lines there shown.

For a conventional prior art diagonal measurement the body to be moved is always moved continuously along each diagonal, in contrast to the incremental movement groups described above where the body involved is only located on the diagonal at the ends of the diagonal segments. The distance of each such incremental movement can be described in terms of the length r of each diagonal segment and the angles Theta and Phi as follows: Each X axis incremental movement starting with an x axis movement is a distance rCos ϕ. Each Y axis incremental movement is a distance rSin ϕ Sin θ. Each Z axis incremental movement is a distance rSin ϕ Cos θ.

Figure 3:
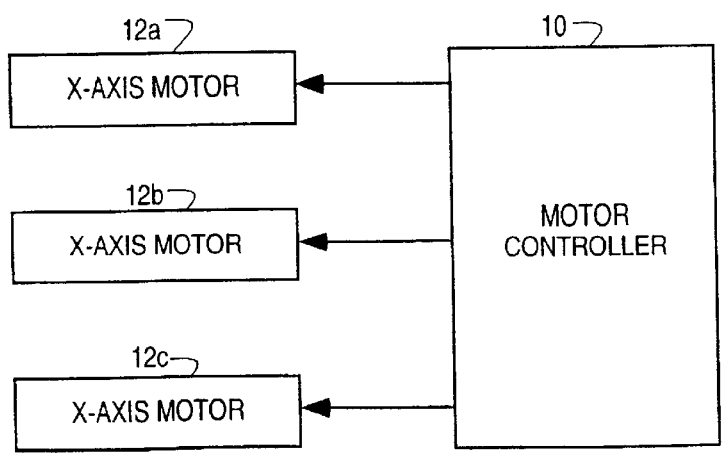
FIG. 3 is a block diagram showing a motor controller in block form and three motors controlled thereby to drive the tool bit or other body being moved along the X, Y and Z axes.

Refer now to FIG. 3 which is a block diagram showing a motor controller 10 in block form and three motors 12a, 12b and 12c controlled thereby to drive the tool bit or other body being moved along the X, Y and Z axes. The motor controller 10 is programmed to drive the body along each axis in sequence instead of simultaneously operating to achieve the body along the diagonal.

The software which operates the controller 10 to move the tool bit or other body involved in a given selected sequence which is repeated for each segment of the diagonal involved. There are 6 possible sequences, namely XYZ, YZX, ZXY, XZY, YXZ and ZYX. Depending upon the degree to which various error calculations are desired to be made, measurements for one or more sequences will be made and error calculations made therefrom. The segments of the diagonal for which each body movement of a selected diagonal are carried out preferably are of equal length segments, but they could be of different length.

Figure 4A:
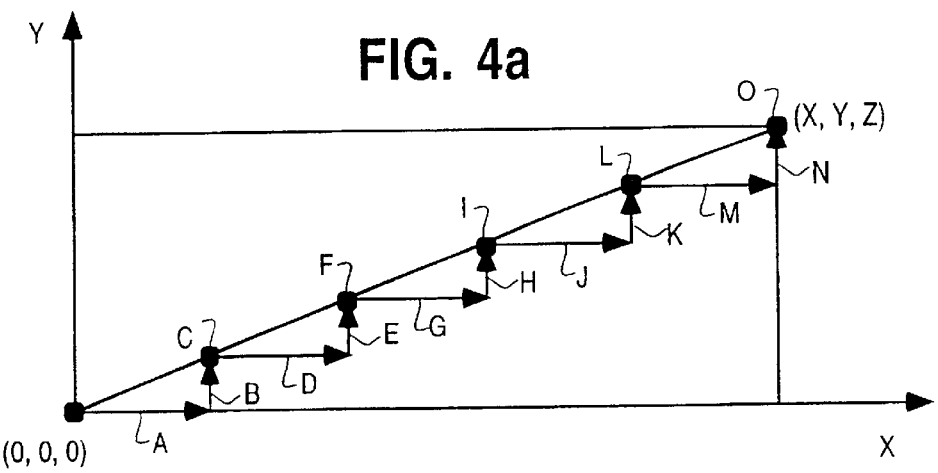
FIGS. 4a and 4b respectively show the body movement paths identified by letters of the movement of the body controlled by a software program operating the motor controller of FIG. 3 and as would be viewed above the XY plane.
Figure 4B:
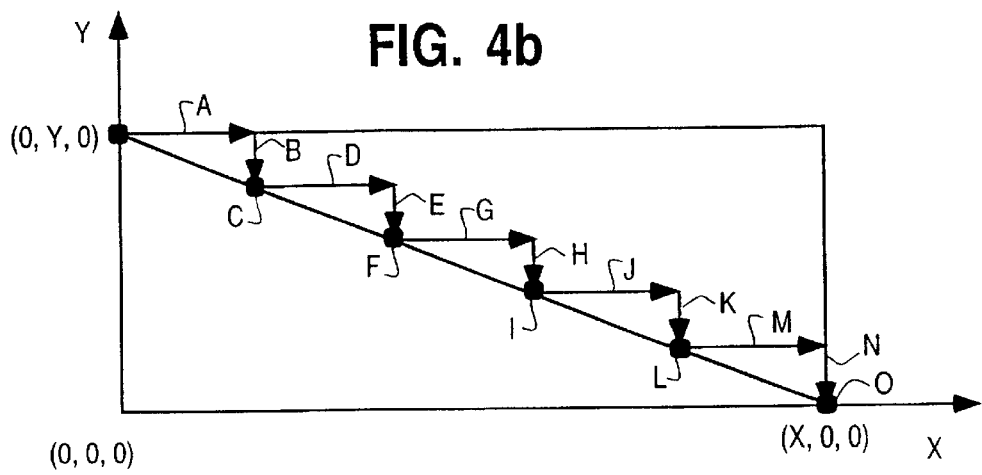
Figure 5A:
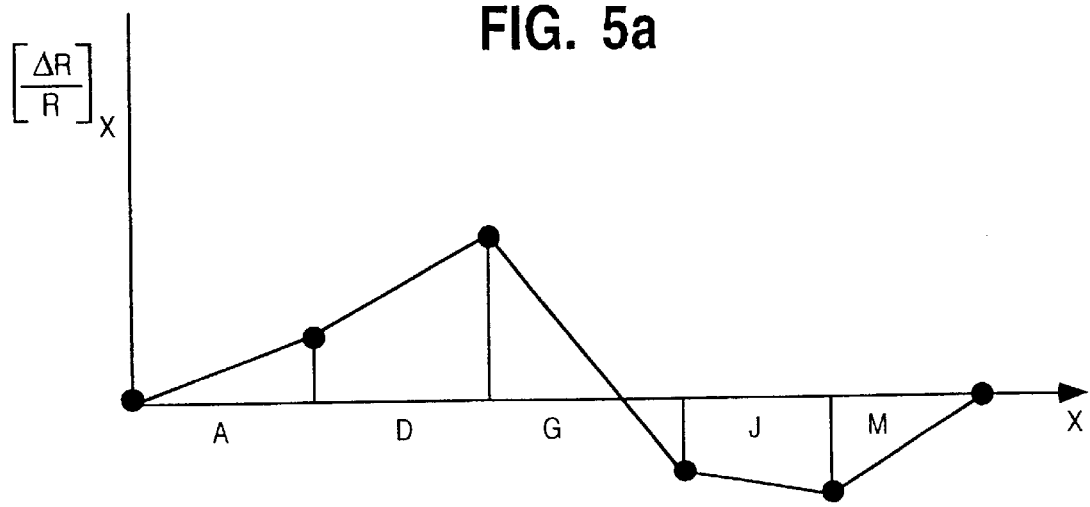
FIGS. 5a, 5b and 5c show examples of data analysis obtained from the error measurements obtained by the present invention. The ΔR is the measured position error in the diagonal direction. The subscript X, Y, and Z indicating the measured position error due to the X-axis, Y-axis, and Z-axis movement respectively, as a tool bit is moved respectively parallel to the X, Y and Z axes along the various lettered identified paths associated with the various segments of the diagonal shown in FIG. 2.
Figure 5B:
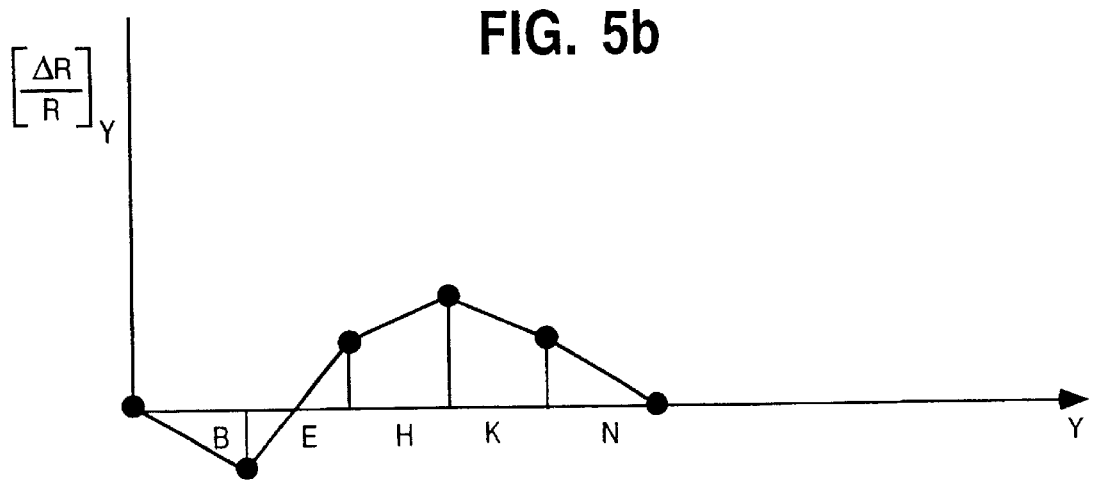
Figure 5C:
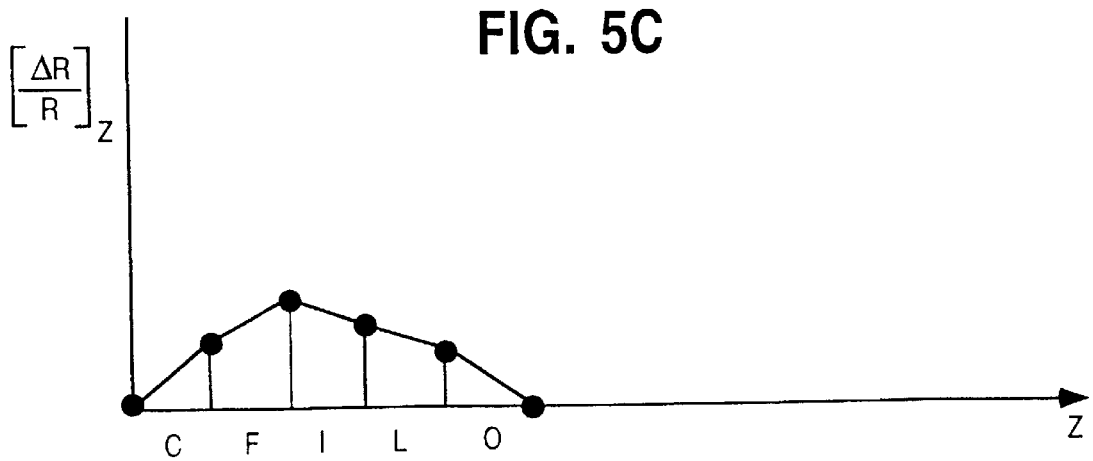

Refer now to FIGS. 4a and 4b which respectively show the paths of body movement with respect to the opposite diagonals of an elongated volumetric space as described above in connection with FIG. 2. The X and Y axis movements are shown respectively by arrows A-D-G-J-M and B-E-H-K-N representing various body movement steps. The Z axis movement out of the plane of the drawing is shown as dots C-F-I-L-O. The body movement illustrated in FIG. 4a starts from point (0,0,0) at the beginning diagonal r shown in FIG. 2 and ends at point (X,Y,Z) on the diagonal r there shown. The body movement illustrated in FIG. 4b starts at the beginning of the opposite diagonal (not shown in FIG. 2) at point (0,Y,0) therein and ends at the point (X,0,0) on this opposite diagonal r'. The curves of FIGS. 5a, 5b and 5c show the result of the position error data collected in an exemplary test run for the various position control steps A-0 previously described. The Delta R is the measurement error computed from the position measurements automatically by the computer program involved for the lettered steps shown in connection with the curves. The X-axis error measurements at the end of steps A, D, G, J, M, are shown in the first curve of FIG. 5a. Similarly for Y-axis movement and Z-axis movement, the position errors are shown in the second and third curves of FIGS. 5b and 5c respectively at the ends of the letter designated steps.

Figure 4C:
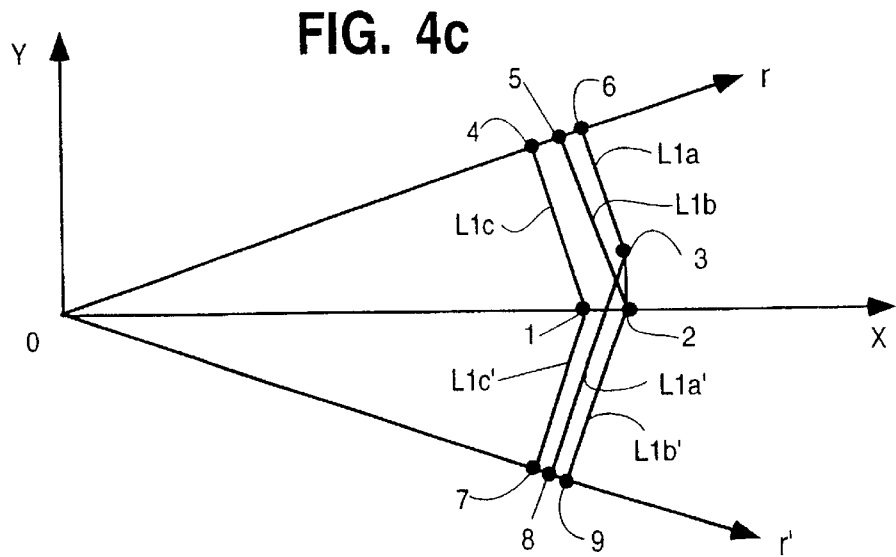
FIG. 4c is a two dimensional view viewed from above the XY plane of the volumetric space in which the body is moved a fixed distance along the X axis and illustrating the desired and actual positions at which the laser beam reflector on the body intercepts the laser beam along two opposite diagonals of the space and the position error components in the X and Y axis directions resulting from the erroneous actual position thereof.

FIG. 4c is a two dimensional view looking down upon the XY plane illustrating the relationship between the measured Delta R for the two opposite diagonals r and r' involved. The Figure represents the linear displacement and straightness errors occurring when a body is desirably moved from point 0 in the X axis direction to a point 1 on the X axis but because of linear displacement and straightness errors is moved instead to point 3, a small error distance equal to the distance between points 2 and 3 in the plus Y axis direction and a small error distance between points 1 and 2 in the X axis direction. The line L1a represents a flat laser beam reflector carried by the body which intercepts a laser beam at point 6 directed along the diagonal r. If the laser beam was directed along the opposite diagonal r' instead, then the reflector carried by the body represented by the line. L1a' would intercept the laser beam at point 8 on diagonal r'. If the body had been moved the desired distance in only the X axis direction the body would have been at point I on this axis and the reflectors represented by the lines L1c and L1c' would intercept the laser beams involved at points 4 and 7 on the diagonals r and r'. The X axis linear displacement error distance between the points 1 and 3 on the X axis is measured by the difference in the laser reflection distance measurements for points 6 and 4 on the diagonal r and points 9 and 7 on the diagonal r'. If there had been no straightness error, then the body at point 2 on the X axis carrying reflectors represented by the lines L1c and L1c' would intercept the laser beam at points 5 and 8.

The relations between the measured $(\Delta R)_x(+,+)$, $(\Delta R)_x(+,-)$ and the displacement errors $\delta_x(x)$ and the straightness errors $\delta_y(x)$ are as follows.

$$(\Delta R)_x(+, +) = 6 - 4 = \delta_x(x) \cdot \frac{x}{R} + \delta_y(x) \cdot \frac{y}{R}$$

Here, $2-1=\delta_x(x)$, $3-2\delta_y(x)$

See Equations (2) and (3) for exact 3-dimensional relations.

$$(\Delta R)_x(+, -) = 9 - 7 = \delta_x(x) \cdot \frac{x}{R} - \delta_y(x) \cdot \frac{y}{R}$$

As previously indicated, FIGS. 5a, 5b and 5c show examples of data analysis obtained from the error measurements obtained by the present invention. The $\Delta R$ is the measured position error in the diagonal direction. The subscript X, Y, and Z indicating the measured position error due to the X-axis, Y-axis, and Z-axis movement respectively, as a tool bit is moved respectively parallel to the X, Y and Z axes along the various lettered identified paths associated with the various segments of the diagonal shown in FIG. 2.

Figure 6:
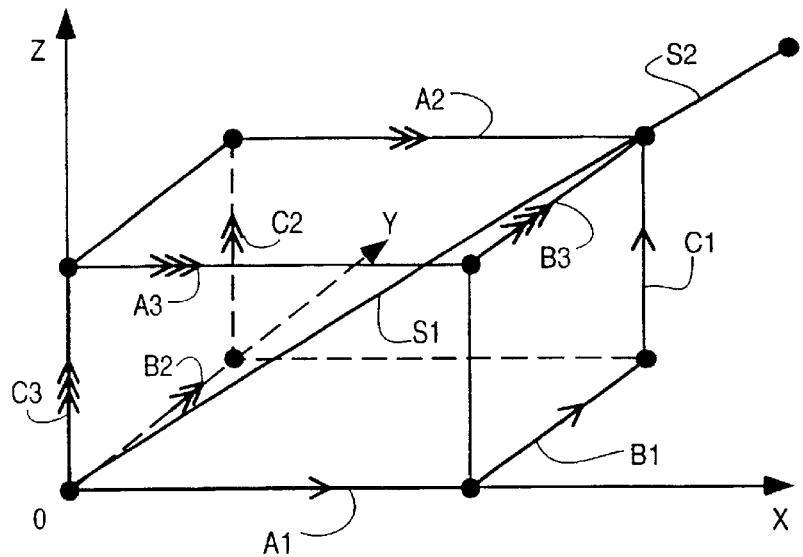
FIG. 6 shows the volumetric space in which a tool bit or other body is to be moved by the present invention along a diagonal of that space in X, Y and Z axis directed movements sequence 1 (single arrows). Also shown in the figure are the sequence 2 (double arrows), Y, Z, and X, and the sequence 3 (triple arrows), Z, X, and Y. The figure showing only one segment S1 of the diagonal.

Refer now to FIG. 6, this is an exemplary diagram showing the letter identified functional steps performed by software program instructions for controlling the operation of the X, Y and Z axis motors shown in FIG. 3 to obtain the body movements described along a segment S1 of a diagonal of the volumetric space in which the machine being tested can move the body involved. Here for the XYZ axis sequence 1

Figure 8A:
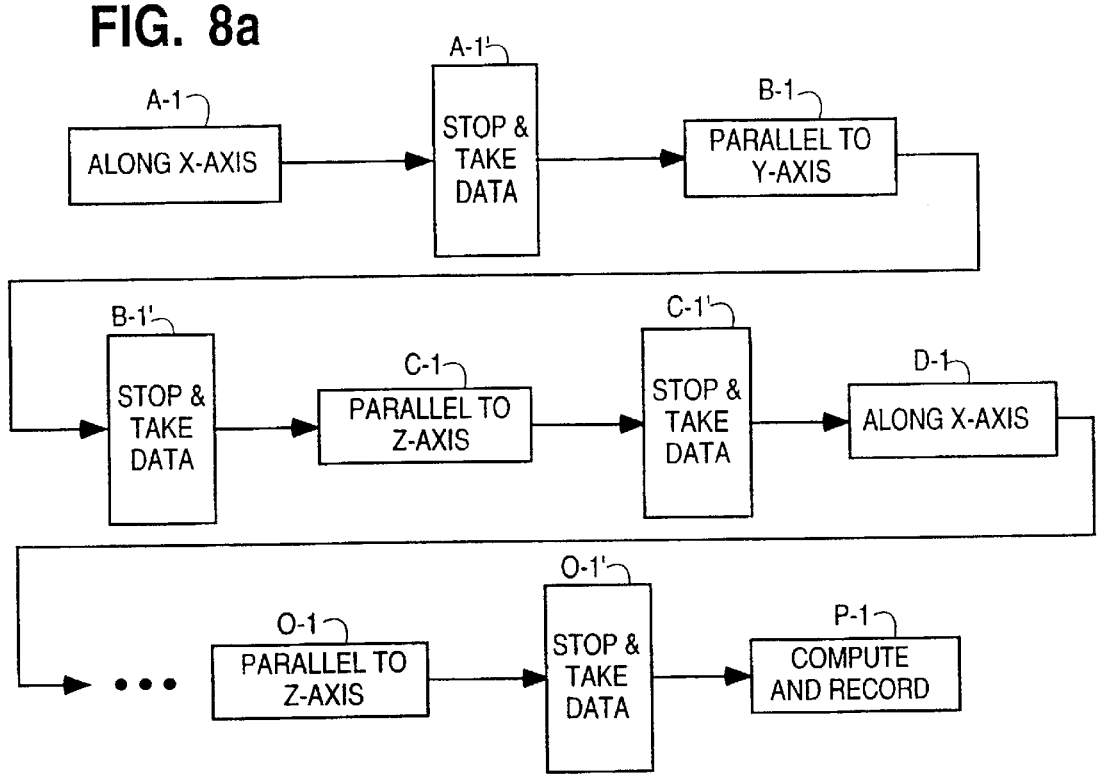
FIGS. 8a and 8b are block diagrams which respectively illustrate the program flow diagrams of the software which controls the movement of the body in axis movement sequences XYZ and ZXY from one end of a given diagonal to the other opposite the 5 segments thereof illustrated in FIG. 2.
Figure 8B:
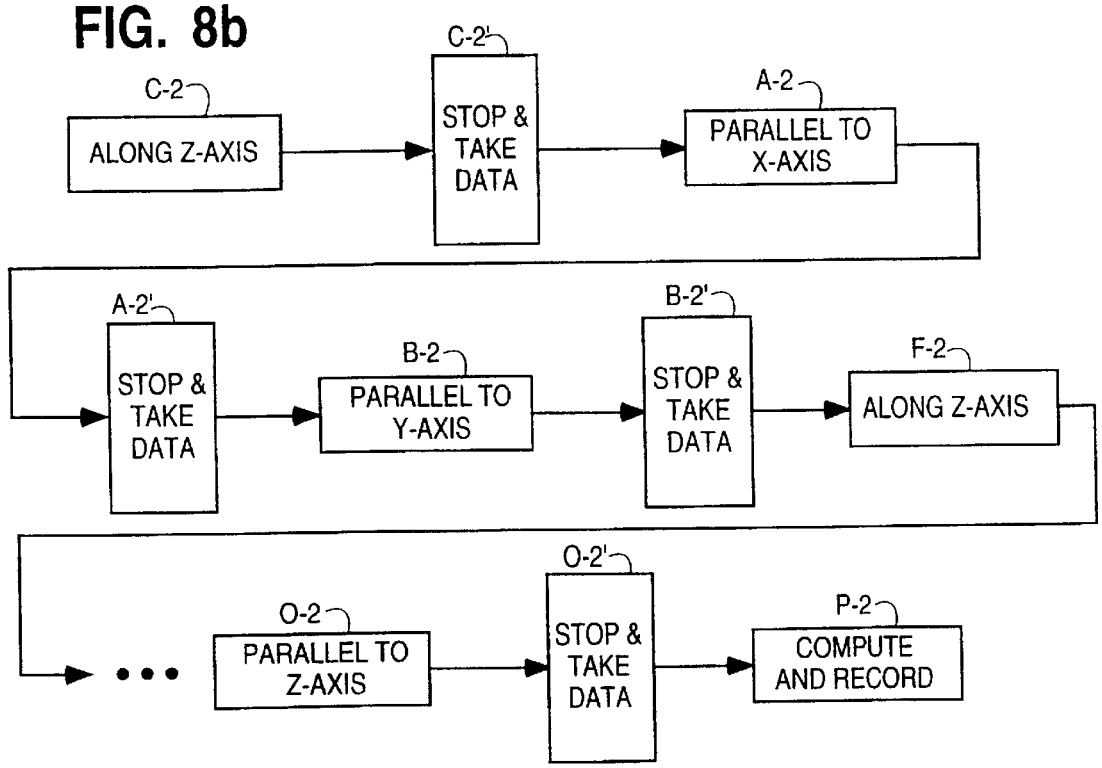

(shown with single arrows), the first body movement is shown by arrow A1 in the direction of the X axis. At the end of this movement the laser measuring apparatus measures and records the distance between O and the point on the diagonal segment S1 where the laser beam is reflected by the reflector carried by the body. The body is then moved in the Y axis direction indicated by arrow B1 until the body is in a position where a movement run the Z axis direction would return the body to the end of segment S1 if there was no error in such body movement. The above described laser reflecting distance measurement and recording operation is then carried out. To complete this one XYZ axis sequence the body is then moved along the Z axis as indicated by the arrow C1 supposedly to return it to the end of the first diagonal segment and another laser reflection point measurement is taken and recorded as described. The steps just described are repeated until the body is supposedly at the end of the last segment except for the accumulated errors of movement. FIG. 8a is a block diagram showing the program flow diagram of the main functional steps carried out by the motor control and laser measuring and recording means involved. These steps are identified by the boxes A-1, B-1 . . . 0-1 (the alphabet characters duplicating those used in FIG. 4a). The last program function carried out is the computation and recording of the appropriate error components as described.

Where backlash problems are to be avoided, as previously explained, the body is then moved between the end of the diagonal involved to the beginning thereof traversing the same supposed paths in the reverse sequence order, that is the ZYX order, and the same measurements are taken and recorded.

Where the error data to be collected calls for more than one sequence to be used, then the body movements, measuring and recording steps just described for the sequence XYZ are earned out for other sequences. FIG. 6 shows the body movements involved for the YZX and ZXY sequences as indicated respectively by the double and triple arrows B2-C2-A2 and C3-A3-B3. FIG. 8b shows the program flow diagram for the ZXY sequence identified by the arrows C3-A3-B3 in FIG. 6.

Figure 7:
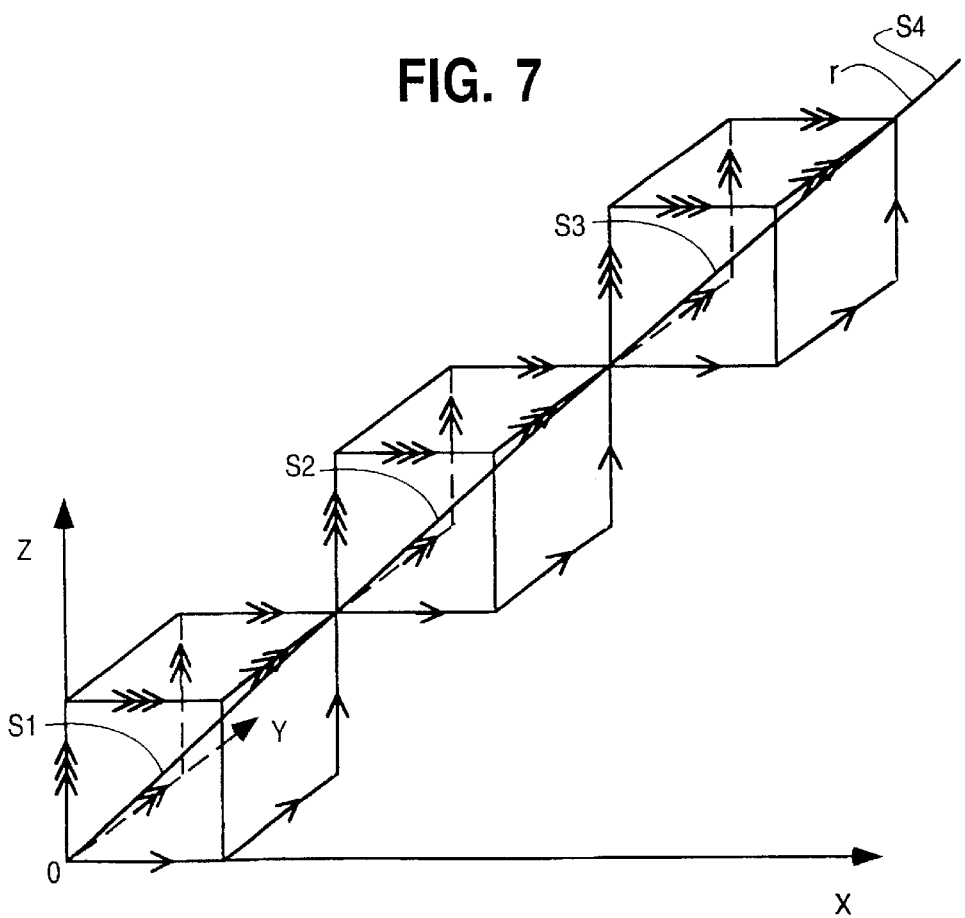
FIG. 7 is similar to FIG. 6 but shows body movement along 3 diagonal segments S1, S2, and S3.

Refer now to FIG. 6, which shows the actual body movements about the first segment of a diagonal for three of the possible 6 movement sequences. The single arrows indicate the movement of X-axis first, then Y-axis and Z-axis. The double arrows indicated the movement of Y-axis first, then Z-axis and X-axis. The triple arrows indicated the movement of Z-axis first, then X-axis and Y-axis. The segments containing the arrows A1, A2, and A3 in the same direction but separated by a fixed distance should show the same error results, except for what is referred to as the Abbe offset for the angular errors. Hence the differences of errors on these segments can be used to determine the angular errors due to X displacement. Similarly, the body movements represented by the arrows B1, B2, and B3 can be used to determine the angular errors due to Y axis displacement and the body movements represented by the arrows C1, C2 and C3 can be used to determine the angular errors due to Z axis displacement. The broader aspects of the invention envision movement steps other than those following the shape of a cube as shown in FIG. 6. FIG. 7 shows body movement sequences following a non-cubic path over 3 segments of a diagonal.

It is noted that for all these sequential diagonal data collections, the laser direction stayed the same, only the movement sequences are changed. Hence a large amount of data can be collected with a single setting. With 4 settings all 4 diagonals can be measured. Hence it is possible to collect all the data along 4 diagonals within a few hours. Since the machine movements can be preprogrammed and the data collections are all automatic, this minimized the human error and saves time.

Figure 9A:
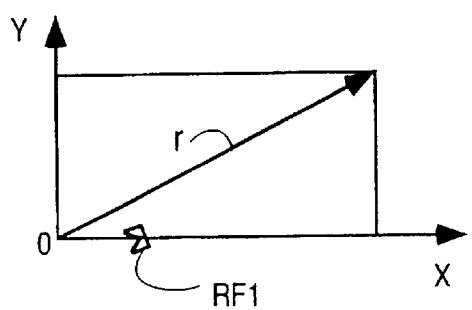
FIGS. 9a is a plan view of the volumetric space in which the body can be moved and looking toward the XY plane, the Figure showing the initial segments of the diagonal along which the body position error measurements are taken in the practice of the invention after each incremental X, Y and Z axis movement with respect to such diagonal. The Figure also shows the laser beam of the interferometer which makes such measurements directed along such diagonal and an inoperable conventional sized retroreflector carried by such body and of such small size as to not intercept the laser beam when the body is initially moved the required short distance along the X axis.

Now it would be helpful if we discuss various laser measuring apparatus useful (and not useful) in making the various position measurements above described. FIG. 9a is a plan view of the volumetric space in which the body can be moved, looking toward the XY plane. The Figure shows the initial segments of the diagonal r along which the body position errors measurements are taken . The Figure also shows the laser beam of the interferometer which makes such measurements directed along such diagonal and an inoperable conventional sized retroreflector RF1 carried by such body and of such small size as to not intercept the laser beam when the body is initially moved the required short distance along the X axis.

Figure 9B:
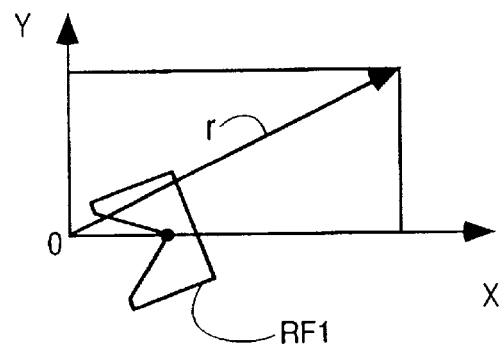
FIG. 9b is a view similar to FIG. 9a except that the body carries a relatively large retroreflector which intercepts the laser beam for the incremental X, Y and Z axis directional movements of the body.

FIG. 9b is a view similar to FIG. 9a except that the body carries a relatively large retroreflector RF2 which intercepts the laser beam for the incremental X, Y and Z axis directional movements of the body. The size of the retroreflector is determined by the unit movement along the X-axis times Sin $\phi$, where $\phi$ is the angle shown in FIG. 1. The large retroreflector can reflect the laser beam toward the laser head. However the large lateral displacement can displace the return beam away from the receiver and the measurement interrupted, unless a double-pass optical arrangement is used as shown as FIG. 10a.

Figure 10A:
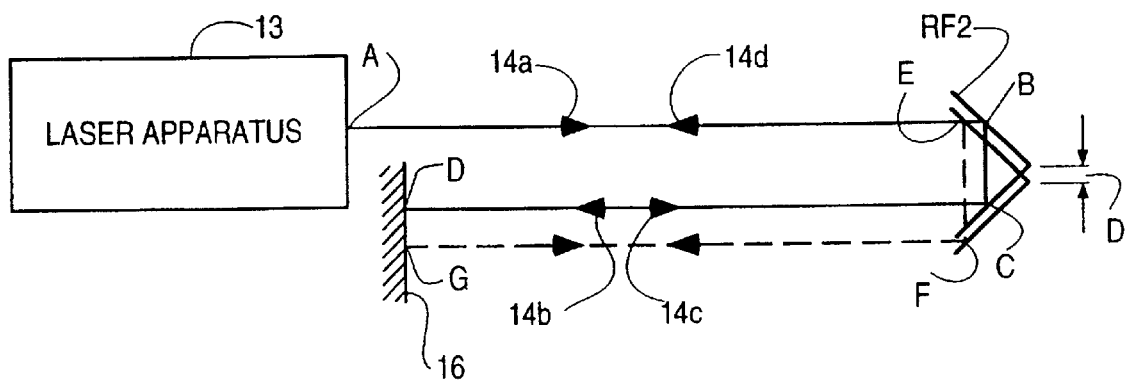
FIG. 10a shows a double pass optical arrangement for a single aperture laser interferometer system which is preferably used to carry out the position error measurements of the present invention.

FIG. 10a shows a double-pass laser measuring apparatus useable in the present invention. The displacement of the large retroreflector RF2 along the selected diagonal in the various X, Y and Z axis directions involved is measured along the diagonal involved. The laser beam 14a starting from the laser head 13 at point A will be reflected at point B and C. The reflected laser beam 14b will reach a stationary flat mirror 16 at point D. The flat-mirror is perpendicular to the incoming laser beam. Then the reflected beam 14c will be coincident with the incoming beam. Hence the further reflected beam 14d will reach the beams starting point A at the single aperture of the laser apparatus 13. If the retroreflector is laterally moved a amount D, the beam will be reflected at reflector points E and F where it reaches point G on the flat mirror 16. The reflected beam will be reflected at points F and E where it is returned to the single aperture point A of the laser apparatus 13. The optical path length ABCD is exactly equal to the path length AEFG. Hence the measurement is not effected by the large lateral displacement of the retroreflector. The maximum lateral displacement is equal to ±half of the retroreflector diameter.

Figure 10B:
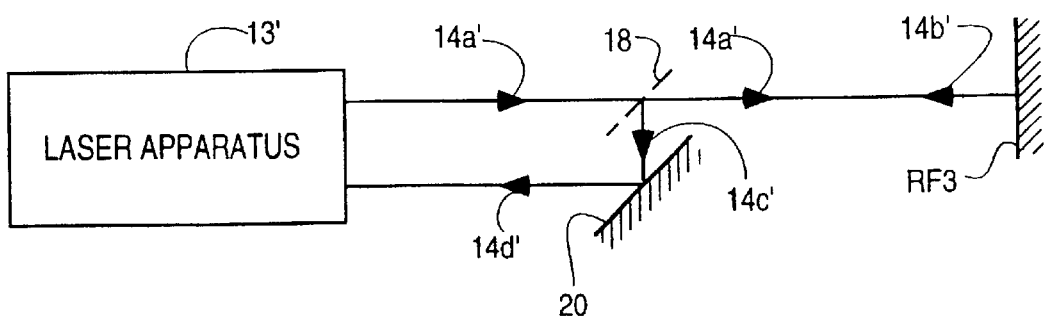
FIG. 10b shows an optical arrangement to convert a commercially available double aperture laser interferometer system using a typically small corner cube retroreflector not useable with the present invention to one so useable when the corner cube is replaced by a flat mirror.

FIG. 10b shows a commercially available double aperture laser head 13' with a modified optical arrangement using a flat-mirror RF3 as the target. The output laser beam 14a' is reflected by the flat-mirror target PF3 back towards the exit aperture. A beam splatter 18 then reflects half of the return beam towards a fixed high reflectivity mirror 20 which reflects the return beam towards the second receiving aperture of the laser head 13'.

Figure 10C:
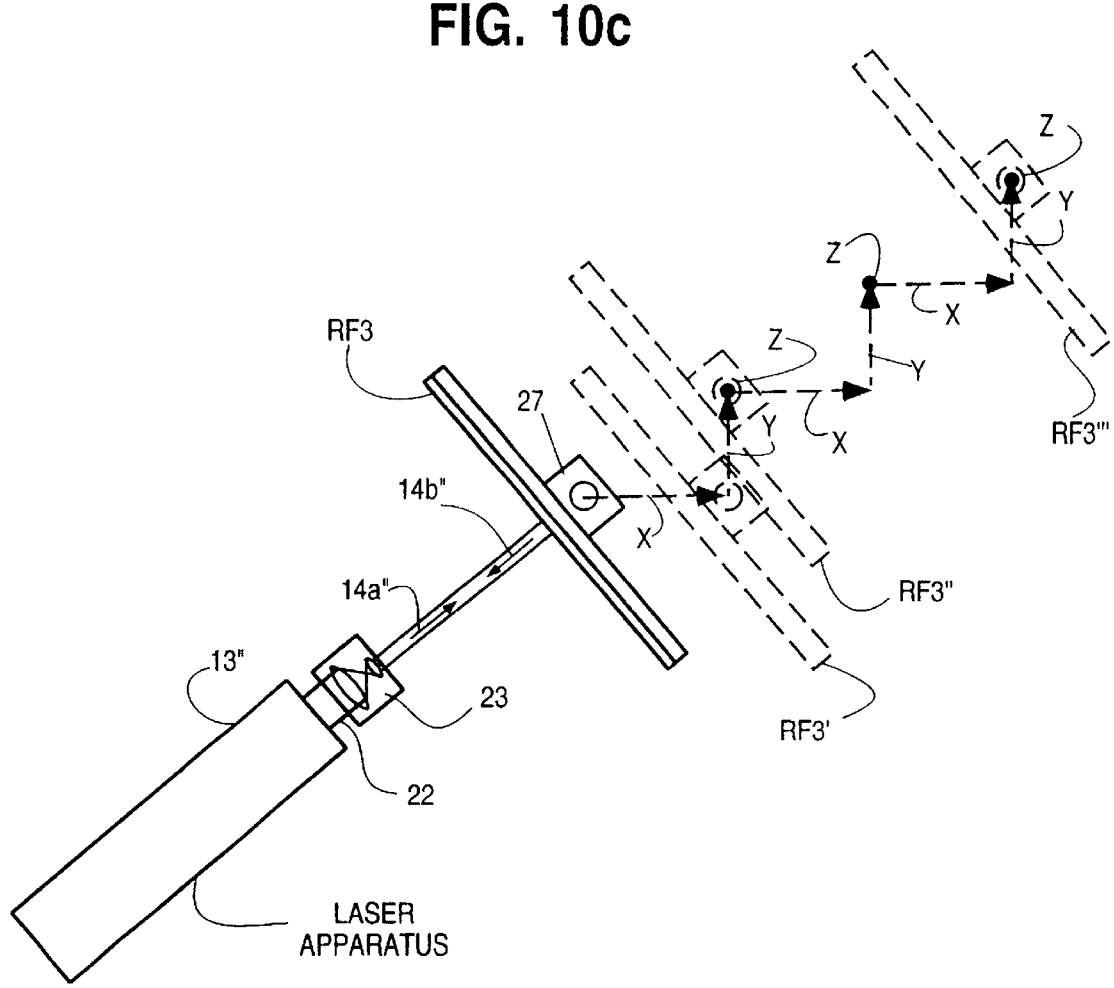
FIG. 10c shows a single aperture laser measuring system with an optical arrangement using a flat-mirror as target and an optical adapter to convert a collimated laser beam to a small diameter and divergent beam.

FIG. 10c is a drawing of a laser measuring system using a flat-mirror RF3 as target, and an optical adapter 23 which convert the collimated laser beam directed from a single aperture laser apparatus 13" to a small diameter and divergent beam 14a". Therefore any small angular errors of the machine spindle will not cause the laser to be out of alignment. This beam 14a" is reflected by the large flat first surface of the mirror RF3 mounted on a spindle 27 of the machine tool system involved. The reflected beam 14b" is parallel to the output beam 14a" and passing though the optical adapter 23 to re-enter the receiving aperture of the laser head 13". The dotted lines RF3', RF3", and RF3'" show the spindle and the flat-mirror positions during the sequential XYZ axis movement steps.

The advantages of using an optical adapter 23 and a flat-mirror RF3 are lightweight, compact and lower cost as compared with using a large retroreflector and the double-pass optical arrangement shown in FIG. 10a.

Figure 11A:
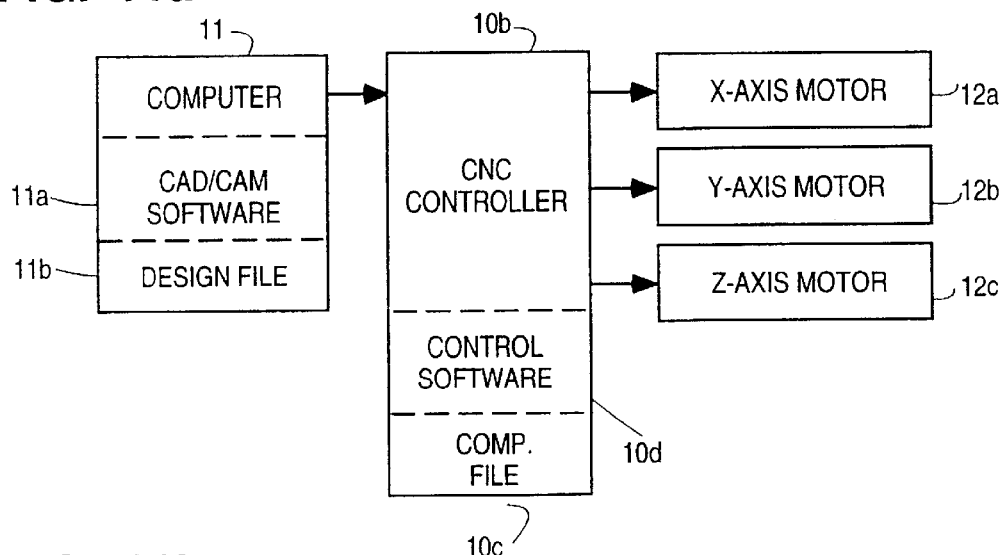
FIG. 11a shows a block diagram of a conventional error compensation scheme. Here the compensation file is a lookup table for the controller based on the errors measured by the vector method.

FIG. 11a shows a block diagram for the conventional error compensation scheme. Here the compensation file is stored inside the CNC (computer numerical control) controller 10b and the error compensation is done by lookup in a compensation file 10c stored in the CNC controller 10b and the feeding by that controller of corrected position control signals to the x-axis motor 12a, the y-axis motor 12b and the z-axis motor 12c. However, due to hardware limitations, it is rather difficult to compensate the angular errors and the non-rigid body errors. The motor control computer 11 has stored therein a design file 11a which identifies the details of the shape of the product to be formed by the machine tool involved. The CAD/DAM software 11a in the computer 11 accesses the design file 11a and generates body position signals fed to the controller 10b having special compensation software 10d which converts the signals fed to the controller to modified motor control signals which will compensate for the errors stored in the compensation file 10c so that the motors will more accurately control the position of the machine tool or other body involved.

A typical compensation file contains a table, part of which could be as follows;

|  | $\delta_x(x)$ | $\delta_y(x)$ | $\delta_z(x)$ |
|---|---|---|---|
| x = 0 | 0.00001 | −0.00001 | 0.000001 |
| x = 1 in | 0.00002 | 0.00001 | 0.000002 |
| x = 2 in | −0.000003 | 0.00002 | 0.00005 |
| x = 3 in |  |  |  |
| x = 20 in | 0.00001 | 0.000035 | 0.000009 |
|  | $\delta_x(y)$ | $\delta_y(y)$ | $\delta_z(y)$ |
| y = 0 | 0.000003 | −0.00001 | 0.000035 |
| y = 1.5 in | 0.000025 | −0.00003 | 0.000045 |
| y = 3 in | 0.000008 | −0.00008 | 0.000025 |
| y = 4.5 in | −0.000009 | 0.00009 | 0.000001 |
| y = 30 in | 0.000035 | 0.000009 | −0.000008 |
|  | $\delta_x(z)$ | $\delta_y(z)$ | $\delta_z(z)$ |
| z = 0 | −0.000056 | 0.000076 | 0.000013 |
| z = 2 in | −0.000023 | −0.00003 | 0.000002 |

| | | | |
|---|---|---|---|
| z = 4 in | 0.000014 | −0.00008 | 0.00005 |
| z = 40 in | 0.0000085 | −0.0000089 | −0.0000089 |

These errors due to X, Y and Z axis movement consist of linear displacement errors, vertical straightness and horizontal straightness errors for each measured increment of the whole body travel along each of these axes. For movements less than these increments, the controller will send position control signals which include error correction components which are proportional to the lesser degrees of movement involved.

The compensation file can be designed to include squareness, pitch, yaw and roll angular errors derived from the added vector measurements and calculations made therefrom as previously, indicated in this specification.

Figure 11B:
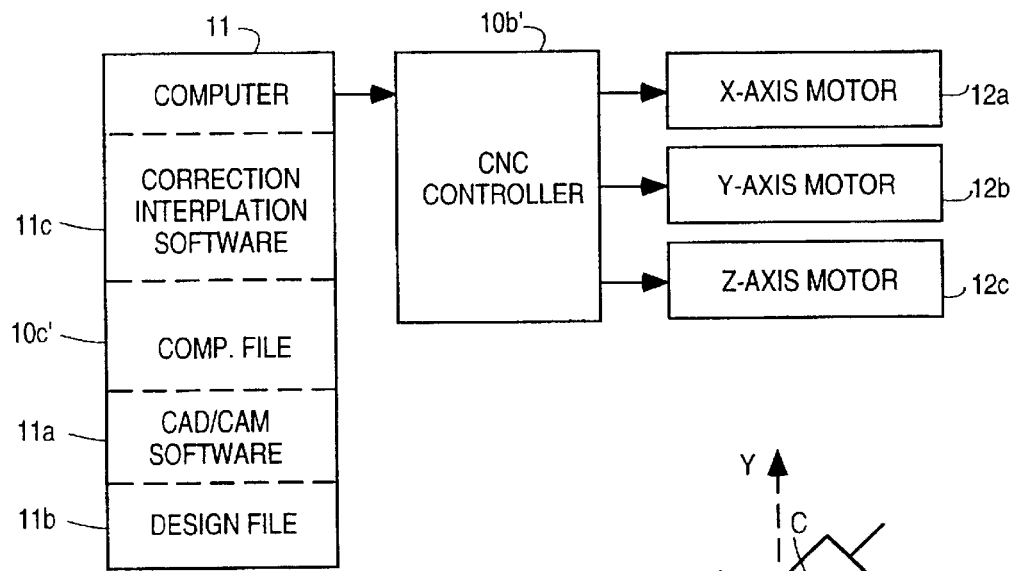
FIG. 11b shows a block diagram of a new error compensation scheme. Here the compensation file is a lookup table for the machine command interpolation software.

As shown in FIG. 11b, another aspect of the invention is to take the compensation function out of the controller 10b of FIG. 11a, which must be custom designed to work with the compensation file 10c, so that a standard CNC controller 10b' can be used. This requires machine error correction interpolator software 11c. The error correction interpolator software 11c is placed in the computer 11 where it accesses the compensation file 10c' also now in the computer 11 and responds also to the signals generated by the CAD/CAM software 11a. The compensation file 10c' can be that produced by the inferior prior art, but is preferably a file generated by the present method invention above described. The interpolator software 11c effects the modification of the signals which the CAD/CAM software generates upon accessing the design file 11b in the computer to generate signals fed to the controller 10b' which will cause the controller 10b' to energize the motors 12a, 12b and 12c to move the body involved more accurately. As above indicated, the interpolation software 11c permits both the computer 11 and controller 10b' to be the standard computer and controller used with the particular computer controlled machine tool or other body movement system involved. In other words, the interpolator 10d generates tool path control signals which are pre-corrected with the measured machine errors. Then the corrected body path signals are fed to the controller 10b'. Since all the corrections are done in the software there is no hardware limitation. Thus, the output of the CAD/CAM and the input of the controller are standard, hence the machine error correction interpolator can be used on any standard machine tool motor control system.

Figure 12:
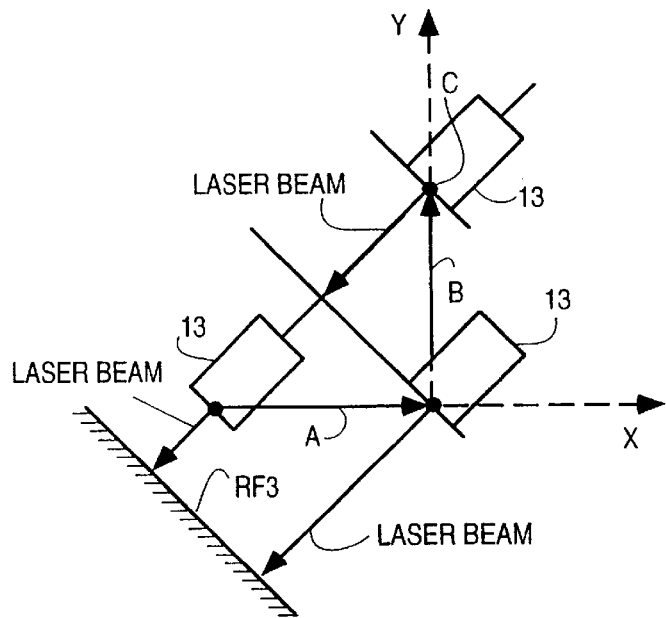
FIG. 12 shows a variation of the present invention where the laser beam deflector is stationary and the laser measuring apparatus is mounted on the tool spindle or other body to be moved.

As previously indicated, while FIGS. 2–10c illustrate the preferred method and apparatus aspects of the invention which produces the compensation file 10c using a laser measuring system where the reflector is mounted on the machine tool spindle or other body to be moved, the broader aspects of the invention includes the placement of the measuring apparatus which generates the laser or other beam involved on the body to be moved mounting the reflector on a stationary mounting surface. FIG. 12 illustrates this form of the invention where reflector RF3 is a very large stationary reflector and the laser apparatus 13 is carried by the machine tool spindle which, during the error collection data process, is moved in groups of X, Y and Z axis movement increments indicated by the arrows A, B and C. The apparatus 13 is shown directing the beam parallel to a diagonal of the three dimensional volumetric space involved for all positions of the spindle. The reflecting surface of the reflector RF3 is shown at right angles to the laser beam at all times.

It should be understood that numerous modifications and additions can be made in the various exemplary forms of the invention disclosed herein without deviating from the broadest aspects of the invention. However, these exemplary forms of the invention are to be considered specific aspects of the invention.

I claim:

1. A method of determining the accuracy a body is moved under computer control using position measuring apparatus which includes beam directing means which directs a reflectable energy beam in a given direction therefrom and reflector means including at least one reflector, one of said at least one reflector and beam directing means with any other associated reflectors to be mounted on said body and the other to be mounted at a relatively stationary point, said at least one reflector being sufficiently large to intercept and first reflect said beam in a manner which will ultimately cause the beam to return back to said beam directing means even when the body is moved along a given path or paths in a path direction different from the beam direction, said apparatus being adapted to make measurements of the distance between said at least one reflector and beam directing means from a characteristic of the received beam at various measuring points along the body's path of movement, said method comprising the steps of:

placing one of said at least one reflector and beam directing means with any other reflectors needed on said body and mounting the other of same at a stationary point relative thereto so that as said body is moved by said computer along said given path or paths said measuring apparatus measures and records the distance between said at least one reflector and beam directing means at said measuring points;

operating a computer to direct said body to move the same along said given path or paths so that said at least one reflector intercepts and causes said beam ultimately to return to said beam directing means where said measuring apparatus measures the distances changes between said one large reflector and beam directing means, there being stored in a memory the ideal body position data for said measuring points; and comparing the various actual body position measurements as determined from said one reflector to beam directing means distance measurements with said stored ideal position data to determine the body position error when the body is at said measuring points.

2. The method of claim 1 wherein said body movement momentarily stops at each of said measuring points on said path or paths, and said measuring apparatus is programmed to automatically measure and record the reflector distance measurements when the body movement momentarily stops.

3. A body position error measuring method using a measuring apparatus including beam directing means which directs a reflectable energy beam in a given direction therefrom and reflector means including at least one reflector which is to receive the beam directly from said beam directing means and is sufficiently large to intercept and first reflect said beam in a manner which will ultimately return the beam back to said beam directing means even when the body is moved in a given path or paths in path directions different from the beam direction, said apparatus being adapted to make measurements of the changing distances between said at least one reflector and beam directing means under computer control in a given space having at least two orthogonal axes and at least two opposite diagonals, said method including the steps of:

mounting one of said at least one reflector and said beam directing means with any other reflector if said reflector means includes the same on said body and the other of same at a relatively stationary point, said beam directing means directing said beam along any selected diagonal;

operating said computer to move said body between the ends of a first selected one of said at least two possible opposite diagonals in said space, said movement between the ends of said selected diagonal being in identical repeated groups of sequential incremental movements opposite the various segments of said selected diagonal so that the first step in each group in the absence of any movement errors begins at one end of a segment and proceeds parallel to one of the orthogonal axes of said space and ends at a measuring point, and the last step in each movement group terminates at a given desired measuring point which in the absence of any position error would be at the end of the diagonal segment involved, the said one reflector intercepting the beam directed along said selected diagonal even though the body is not moved parallel to the beam direction; and there being stored in a memory the ideal body position distances when the body is at said measuring points if the computer had moved said body without error to said measuring points; measuring with said apparatus the actual said one reflector to beam directing means distances along the diagonal involved when the body is moved to said measuring points at the ends of each of said incremental movements, and computing from the data based on said actual one reflector to beam directing means distance measurements and the ideal body position distances to compute a body movement error component.

4. The method of claim 1 or 3 wherein said one reflector is mounted on said body and said beam directing means with any other reflector needed are mounted at a relatively stationary point.

5. The method of claim 1 or 3 wherein said beam directing means with any other reflector means needed is mounted on said body and said one reflector is mounted at a relatively stationary point.

6. The method of claim 1 or 3 wherein said one reflector is a flat reflecting surface against which the beam is directed thereto at rights angles.

7. The method of claim 3 repeated for the other of said opposite diagonals to compute a body movement error component based on the measurements taken as a result thereof.

8. The method of claim 3 wherein the body is moved in a three dimensional volumetric space having orthogonal X, Y and Z axes and two pairs of opposite diagonals defining said space, and said method is repeated for at least the diagonal which is opposite to said first selected diagonal to compute a body movement error component based on the measurements taken as a result thereof.

9. The method of claim 8 repeated for at least another diagonal to compute body movement error components based on the measurements taken as a result thereof.

10. The method of claim 7 repeated for the remaining diagonals of said volumetric space to compute body movement error components based on the measurements taken as a result thereof.

11. The method of claim 3 repeated for at least an additional one of the possible other different axis movement sequences to compute one or more body error movement components based on the measurements taken as a result thereof.

12. The method of claim 3, 7 or 9 repeated for at least two additional ones of the possible six different axis movement sequences to compute one or more body movement error components based on the measurements taken as a result thereof.

13. The method of claim 3, 7 or 9 repeated for all of the additional possible different axis movement sequences to compute one or more body error movement components based on the measurements taken as a result thereof.

14. The method of claim 1, 3 or 9 wherein error compensation tables are prepared from the body movement error computations and using said compensation tables to correct the movement of said body by said computer.

15. The method of claim 3 or 9 wherein said at least one computed body movement error component is the linear displacement error component relative to each axis.

16. The method of claim 3 or 9 wherein said at least one computed body movement error component is the straightness error component relative to each axis.

17. The method of claim 3 or 9 wherein said at least one computed body movement error component is the squareness error component relative to each axis.

18. The method of claim 3, 7 or 9 wherein said computed body movement error component include the pitch, yaw and roll error components relative to each axis.

19. The method of claim 3 or 9 wherein said at least one computed body movement error component is a non-rigid body error component.

20. The method of claims 3 or 9 wherein said computed body movement error components include at least the linear displacement and straightness error components.

21. The method of claim 1 or 3 wherein said laser measuring apparatus is like that shown in FIG. 10a.

22. The method of claim 1 or 3 wherein said laser measuring apparatus is like that shown in FIG. 10b.

23. The method of claim 1 or 3 wherein said laser measuring apparatus is like that shown in FIG. 10c.

24. A body position error measuring method using a measuring apparatus including beam directing means which directs a reflectable energy beam in a given direction therefrom and reflector means including at least one reflector which is to receive the beam directly from said beam directing means and is sufficiently large to intercept and first reflect said beam in a manner which will ultimate return the beam back to said beam directing means even when the body is moved in a desired path direction different from the beam direction, said apparatus being adapted to make measurements of the changing distance between said at least one reflector and beam directing means from a changing characteristic of the received beam at various measuring points along the body's path of movement in a given space having two opposite diagonals under computer control, said method including the steps of:

mounting one of said at least one reflector and said beam directing means with any other reflector if said reflector means includes the same on said body and the other of same at a stationary point, said beam directing means directing said beam in a direction non-parallel to said axes;

operating a computer to move said body between the ends of a first selected one of four possible diagonals in a given space, said movement between the ends of said diagonal being in identical repeated groups of sequential incremental movements opposite the various segments of said selected diagonal so that the first step in each group in the absence of any movement errors begins at one end of a segment and proceeds parallel to one of the orthogonal axes of said space and ends at a measuring point, and the last step in each movement group terminates at a given desired measuring point which in the absence of any position error would be at the end of the diagonal segment involved, the said one reflector intercepting the beam directed along said selected diagonal even though the body is not moved parallel to said direction; and there being stored in a memory the ideal predetermined said one reflector to beam directing means distances when the body is at said measuring points if the computer had moved said body without error to said measuring points; measuring and recording with said apparatus the actual one reflector to beam directing means distances along the diagonal involved when the body is moved to said measuring points at the ends of each of said incremental movements, and comparing and computing with the data based on said actual reflector distance measurements with the data based on said stored ideal reflector distances to compute at least one of several possible body movement error components; and then repeating all of the above steps for at least one additional different sequence of the possible different orthogonal axis movement sequences to compute one or more body movement error components based on the measurements taken as a result thereof.

25. A measuring system for taking position measurements of a body to be moved in a space by a computer-controlled system along a path or paths having various predetermined measuring points, said system comprising:

beam directing means for directing a reflectable beam in one or more given directions in said space;

reflector means including at least one reflector to receive and first reflect said beam, one of said one reflector and beam directing means with any other reflectors said reflecting means may have being mountable on said body and the other of same to be mounted at relatively stationary points, said at least one reflector being sufficiently large that it will receive and reflect said beam in a manner which will ultimately return the beam back to said beam directing means even when the body is moved in a path in directions different from the direction in which the beam is directed;

measuring and processing means responsive to the sensing of the beam returned to said beam directing means when the body is at various measuring points along said path or paths where the of body has moved in directions very different from the direction said beam is directed but where said beam is still reflected by said one reflector for then measuring and storing the distance between said at least one reflector and said beam directing means at said various measuring points;

said processing means having a data storage section to have stored therein the ideal body position data for said measuring points if the body had been moved precisely to the desired path positions, and computing and indicating means responsive to the actual body position measurements and ideal body position data for said measuring points for computing and indicating the degree to which the actual body movement has deviated from the desired body movement.

26. The measuring system of claim 25 wherein said body is to be moved sequentially along straight paths parallel to at least two orthogonal axes in a space defined by said axes and at least two opposite diagonals, said beam is to be directed along at least one of said diagonals of said space, and said body is to be moved sequentially opposite various segments of at least one of said diagonals in repeated groups of at least two sequential body movements opposite each segment along the orthogonal axes of said space so that the first step in each group in the absence of any movement errors begins at one end of a segment and proceeds parallel to one of the orthogonal axes of said space and ends at an assumed measuring point, and the last step in each movement group the body is moved parallel to another one of sid axes where body movement therealong terminates at a given desired measuring point which in the absence of any error would be at the end of the diagonal segment involved, said one reflector still intercepting and reflecting said beam in a manner to return it to said beam directing means, said computing and indicating means which computes and indicates the degree to which the body movement has deviated from the desired body movement being adapted to compute and indicate at least the linear body movement error component along each of said axes.

27. The measuring system of claim 26 wherein said computing and indicating means also computes and indicates the straightness error component along each of said axes.

28. The measuring system of claim 26 wherein the paths said computer is to move said body are identical groups of sequential X, Y and Z axis movements along said various segments of said diagonal of said space, and said measuring points along said paths being the points where the direction of body movement changes to begin movement along another one of said axes.

29. The measuring system of claim 26 further provided with means for generating from said body movement error components a compensation table which, when downloaded into the computer which is to control the body movement in the normal operative control of the movement of said body will reduce the movement errors by compensating for said movement errors.

30. In a body positioning motor control system where a body is to be moved by X, Y and Z axis motors each contributing to the body's position in a volumetric space, said system including X, Y and Z axis body positioning motors, a controller with X, Y and Z axis motors energizing signal outputs for generating a variable output for energizing the respective motors in varying degrees depending on the value of the output signal variable; and a CAD/CAM controlled computer for generating ideal control signals for the controller which develops therefrom said motor energizing signals, the improvement comprising;

an error compensation file which contains tables indicating the body movement error components;

controller output signal modifying means for converting said body movement error components of said file to controller output modifying signals which energize said motors in a manner to correct for said body movement errors so that the body is actually moved along the desired paths called for by the CAD/CAM controlled computer output, said controller output signal modifying means being correction interpolator software means responsive to the error in said compensation file for modifying the signal output of said CAD/CAM controlled computer fed to the controller so that controller output signals moves the body in the desired path so that the body movement error correction is achieved without the need to modify a pre-existing controller.

31. A single-aperture laser beam body position measuring system comprising:

laser beam apparatus for directing a laser beam in a given direction from a first point and responding to the change in a characteristic of the beam returning to said point by indicating the change in the overall laser beam path length involved;

a flat mirror for reflecting said diverging beam;

one of said flat mirror and laser beam apparatus being mounted on a body to be moved along a given path and the other of same being mounted at a relatively stationary point, said flat mirror being oriented at right angles to the direction in which said diverging beam is directed so as to return the beam to said first point of said apparatus, said mirror being of a size that the mirror so reflects said beam even when the body is moved in a path non-parallel to said beam direction.

32. A laser beam body position measuring system comprising:

a double-aperture laser beam apparatus for directing a laser beam in a given direction from a aperture thereof and responding to the change in a characteristic of the beam returning to a second aperture thereof by indicating the change in the overall laser beam path length involved;

a series of reflector means reflector means for reflecting said laser beam emanating from said first aperture to return the beam to a second aperture of said apparatus, one of said reflector means being a first flat mirror, another of said reflector means being a beam splitter and other reflector means for directing the beam ultimately to said second aperture;

one of said first flat mirror and laser beam apparatus with said beam splitter and other reflector means being mounted on the body to be moved along a given path and the other of same being mounted at a relatively stationary point, said first flat mirror being oriented at right angles to the direction in which said diverging beam is directed from said first aperture to return the beam in the direction of said first aperture, said beam splitter being in the path of the beam emitted from said first aperture to allow a portion thereof to reach said first flat mirror which returns the beam it reflects to said beam splitter which then directs a portion of the first reflected beam in a different direction toward said other reflector means which directs the same to said second aperture; said first flat mirror being of a size that the mirror intercepts and reflects said beam back toward said beam splitter even when the body is moved in a path non-parallel to said initial beam direction.

33. The laser beam body position measuring system of claim 32 wherein said other reflector means is a single flat mirror tilted at an angle to return the beam directed thereto from said beam splitter to said second aperture of said laser beam apparatus.

34. The laser beam body position measuring system of claim 31 wherein said laser beam apparatus directs a diverging beam toward said flat mirror.

* * * * *